Patented Nov. 5, 1929

1,734,029

UNITED STATES PATENT OFFICE

GEORGE BARSKY, OF NEW YORK, N. Y., AND ISAAC V. GILES, OF ELIZABETH, NEW JERSEY, ASSIGNORS TO AMERICAN CYANAMID COMPANY, OF NEW YORK, N. Y., A CORPORATION OF MAINE

PROCESS OF PRODUCING BENZOIC ACID

No Drawing.   Application filed March 8, 1926.   Serial No. 93,115.

This invention relates to the production of benzoic and other acids of the benzene and paraffin series and to substances from which the same may be derived.

Our invention is based on the discovery that benzol and other members of the benzene series of hydrocarbons and derivatives thereof, and paraffin hydrocarbons, may be caused to react with cyanuric chloride to produce practically quantitative yields of cyaphenine or homologues or derivatives thereof depending on the hydrocarbon compound used. Under ordinary conditions this reaction does not take place but we have found that the presence of aluminum chloride in an amount at least equal to an equimolecular quantity thereof in the reaction mixture causes a substantially theoretical conversion. The reaction is a typical Friedel and Crafts reaction, but these authors have stated that cyanuric chloride does not react with benzol in this way.

In practicing our invention we may proceed as follows: Cyanuric chloride is prepared by the polymerization of cyanogen chloride which may be accomplished by exposing cyanogen chloride to sunlight or heating the same, which causes the following reaction to take place, (1)   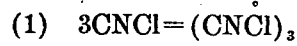

the cyanuric chloride being a colorless, crystalline solid whereas cyanogen chloride is a gas at ordinary temperatures.

In one experiment 15 kg. of cyanuric chloride were mixed with 50 liters of benzol, 35 kg. of anhydrous aluminum chloride were added, and the mixture was heated at atmospheric pressure under a reflux condenser to prevent the escape of vapors at the boiling point of the mixture, for about eight hours. The resultant tarry product, which was free from cyanuric chloride, was treated with water to dissolve the $AlCl_3$ and the white, solid, insoluble residue of cyaphenine was heated with a 3 to 1 sulphuric acid solution whereby it was hydrolized to benzoic acid. The equations for the reactions involved are as follows:

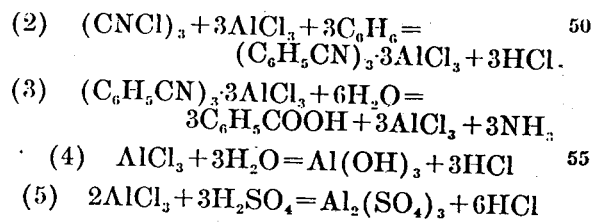

(4)   $AlCl_3 + 3H_2O = Al(OH)_3 + 3HCl$ (5)   $2AlCl_3 + 3H_2SO_4 = Al_2(SO_4)_3 + 6HCl$

The ammonia formed in reaction (3) combines with the excess of sulphuric acid present in the hydrolysis.

The yields of benzoic acid are high, being generally from 83% to 96% of the theoretical, according to the conditions of the particular method of manipulation used and it is a comparatively simple matter to consistently obtain efficiencies of 90% or better. The handling of the materials going into the process and the products obtained present no difficulties as the cyanuric chloride, aluminum chloride, benzoic acid and ammonium sulphate are all solids which are easily weighed and used, and the benzol is a liquid in common use in many industries. The resultant benzoic acid is of high purity especially in that it is free from chlorine, the presence of which can not be avoided in making benzoic acid from toluol by chlorination. The aluminum chloride used in the process may be recovered and treated for reuse.

Although we have described our invention setting forth a single embodiment thereof, it is obvious that various changes may be made therein without departing from the principles set forth. For instance, we may change the proportions of the ingredients in any desired manner except that there should always be present at least an equimolecular amount of anhydrous aluminum chloride as is required in a true Friedel and Crafts reaction, expressing the cyanuric chloride in terms of cyanogen chloride. The reaction may be carried out under pressure or in a partial vacuum if desired and the reflux condenser is not absolutely essential although it is necessary for efficient operation. Instead of heating the mixture to cause a reaction to take place with the formation of a cyaphenine compound we may merely expose the mixture to the action of sunlight for a considerable length of time, say several weeks, with equally good results. The hydrolysis of the cyaphenine-aluminum chloride compound need not take place at atmospheric pressure nor is sulphuric acid essential, as dilute caustic soda or lime solutions have the same effect although at super-atmospheric pressures. We may use in place of benzol the homologues thereof, such as toluol, or derivatives thereof, with the result of obtaining the corresponding acid. These and other changes may be made in our invention, the scope of which is defined in the claims appended hereto.

What we claim is:

1. In a method of making benzoic acid the steps which comprise providing a mixture of approximately equimolecular quantities of benzol, cyanuric chloride and aluminum chloride and causing the same to react at the boiling point of the mixture.

2. In a method of making benzoic acid the steps of which comprise providing a mixture of approximately equimolecular quantities of benzol, cyanuric chloride and aluminum chloride and causing the same to react at the boiling point of the mixture while refluxing said mixture.

In testimony whereof, we have hereunto subscribed our names this 5th day of March, 1926.

GEORGE BARSKY.
ISAAC V. GILES.